(12) United States Patent
Tanzmeister

(10) Patent No.: US 9,248,835 B2
(45) Date of Patent: Feb. 2, 2016

(54) METHOD AND DEVICE FOR ESTABLISHING A TRAJECTORY FOR A VEHICLE

(71) Applicant: Bayerische Motoren Werke Aktiengesellschaft, Munich (DE)

(72) Inventor: Georg Tanzmeister, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/662,834

(22) Filed: Mar. 19, 2015

(65) Prior Publication Data

US 2015/0266475 A1    Sep. 24, 2015

(30) Foreign Application Priority Data

Mar. 20, 2014   (DE) .......................... 10 2014 205 170

(51) Int. Cl.
*B60W 30/095* (2012.01)
(52) U.S. Cl.
CPC ................................ *B60W 30/0956* (2013.01)
(58) Field of Classification Search
CPC ................................................ B60W 30/0956
See application file for complete search history.

(56) References Cited

U.S. PATENT DOCUMENTS

| | | | |
|---|---|---|---|
| 6,487,303 B1* | 11/2002 | Yamaguchi ........... | G06T 7/0044 382/103 |
| 7,194,353 B1* | 3/2007 | Baldwin ................ | G01C 21/00 701/301 |
| 8,401,782 B2 | 3/2013 | Eidehall | |
| 2004/0096082 A1* | 5/2004 | Nakai ................. | G06K 9/00651 382/104 |
| 2007/0282638 A1* | 12/2007 | Surovy ................... | G06Q 40/02 705/4 |
| 2011/0106419 A1* | 5/2011 | Kim .................... | G01C 21/3469 701/532 |
| 2012/0253655 A1* | 10/2012 | Yamada .............. | B60L 11/1861 701/409 |
| 2014/0018996 A1* | 1/2014 | Mian ..................... | G05D 1/0212 701/26 |
| 2015/0022400 A1* | 1/2015 | Smid .................... | G05D 1/0212 342/458 |

FOREIGN PATENT DOCUMENTS

EP     2 765 048 A1    8/2014

OTHER PUBLICATIONS

German Search Report dated Feb. 5, 2015 with partial English translation (12 pages).
Lacaze et al. "Path Planning for Autonomous Vehicles Driving Over Rough Terrain" Sep. 14-17, 1998, seven pages, Computational Intelligence Research Laboratory et al., University of Maryland, College Park, MD.

(Continued)

*Primary Examiner* — Rodney Butler
(74) *Attorney, Agent, or Firm* — Crowell & Moring LLP

(57) ABSTRACT

A method and a device for establishing a trajectory for a vehicle is provided. The method includes the following steps: registering coordinates of objects using a sensor; calculating a cost map on the basis of the registered coordinates, wherein the cost map is subdivided into cells and a cost value is assigned to each cell, which cost value describes the presence and/or the vicinity of an object, calculating a cost space, which has a plurality of layers, wherein each layer is subdivided into cells and a cost value is assigned to each cell, wherein the cost values in the respective layers are calculated in each case for a specific orientation of the vehicle, and determining a trajectory that is as cost-effective as possible.

20 Claims, 8 Drawing Sheets

(56) References Cited

OTHER PUBLICATIONS

Chu et al. "Local Path Planning for Off-Road Autonomous Driving With Avoidance of Static Obstacles" IEEE Transactions on Intelligent Transportation Systems, Dec. 13, 2012, pp. 1599-1616, vol. 13, No. 4.

Eilers et al. "A Path Planning Framework for Autonomous Vehicles" Proceedings of the $9^{th}$ International Workshop on Robot Motion and Control, Jul. 3-5, 2013, pp. 203-208.

* cited by examiner

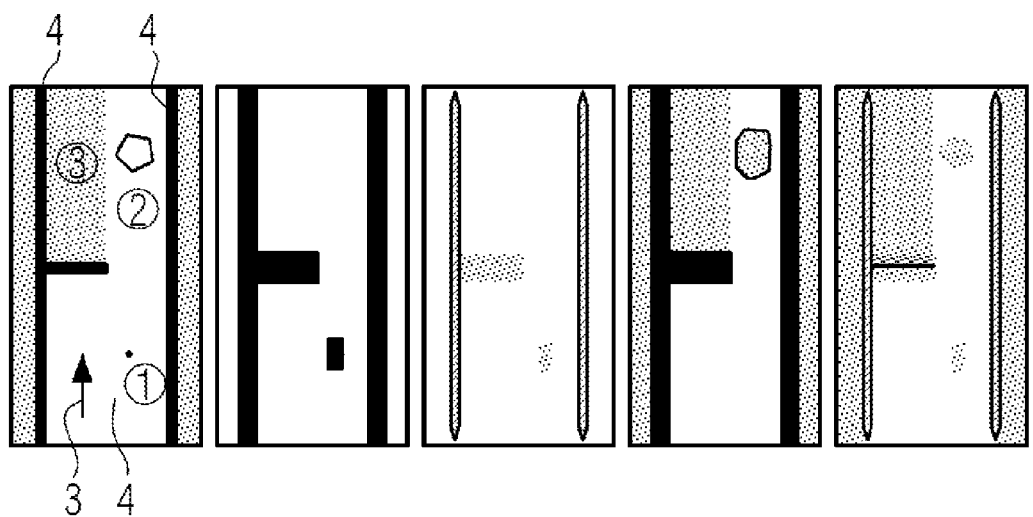

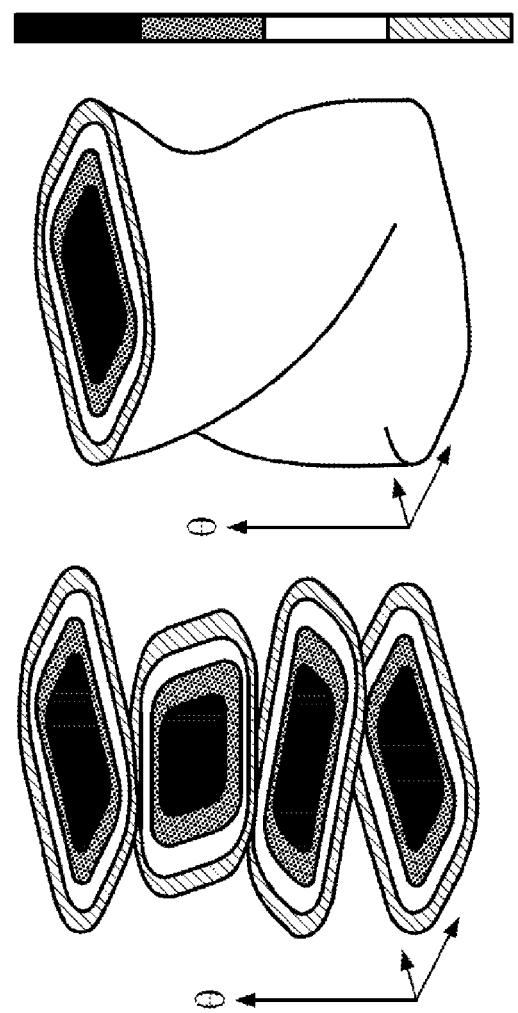
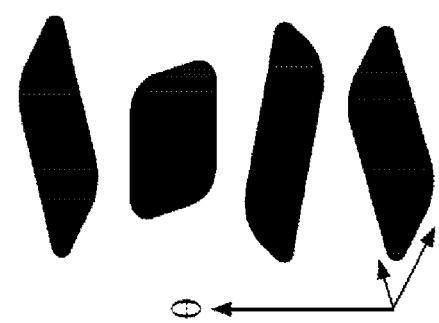
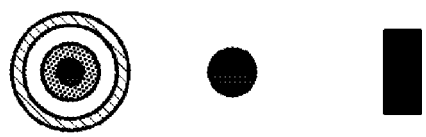
FIG. 5A   FIG. 5B   FIG. 5C   FIG. 5D

Method FAMOD

Input: Map M, z Kernels K[]
Output: Configuration Space Costs C[]

1: *// offline*
2: for i ← 0 to z − 1 do
3: $K_{FFT}[i]$ = FFT(K[i])
4: end for
5: *// online*
6: $T_1$ ← g(M)
7: $T_2$ ← FFT($T_1$)
8: for i ← 0 to z − 1 do
9: $T_3$ ← modulate($T_2$, $K_{FFT}[i]$)
10: $T_1$ ← iFFT($T_3$)
11: C[i] ← h($T_1$)
12: end for

FIG. 7A

Method vHGW-360
Input: Map M, z Kernels K[], robot length l and width w
Output: Configuration Space Costs C[]

1: for i ← 0 to z/2 − 1 do
2: T1 ← rotate(M, 180i/z)
3: C[i] ← vHGW(T1, l)
4: C[z/2 + i] ← vHGW(T1, w)
5: end for
6: for i ← 0 to z − 1 do
7: T1 ← rotate(C[i], 90)
8: if i < z/2 then
9: T2 ← vHGW(T1, w)
10: C[i] ← rotate(T2, −180i/z − 90)
11: else
12: T2 ← vHGW(T1, l)
13: C[i] ← rotate(T2, −180i/z)
14: end if
15: end for

FIG. 7B

Method Check Cells Between $q_0$ and $q_1$

Require: $\Delta x, \Delta y, \Delta \theta \neq 0$

1: $(x, y, \theta) \leftarrow \text{round}(x_0, y_0, \theta_0)$

2: $(x_{end}, y_{end}, \theta_{end}) \leftarrow \text{round}(x_1, y_1, \theta_1)$ 3: $l \leftarrow \sqrt{(\Delta x)^2 + (\Delta y)^2}$ 4: $(v_x, v_y, v_\theta) \leftarrow 1/l \, (\Delta x, \Delta y, \Delta \theta)$ 5: $(s_x, s_y, s_\theta) \leftarrow \frac{1}{2} (\text{sgn}\Delta x, \text{sgn}\Delta y, \text{sgn}\Delta \theta)$ 6: $(t_x, t_y, t_\theta, t_{min}) \leftarrow (-1, -1, -1, 0)$ 7: while $(x, y, \theta) \neq (x_{end}, y_{end}, \theta_{end})$ do

8: if $t_{min} = t_x$ then

9: $x \leftarrow x + 2s_x$

10: end if

11: if $t_{min} = t_y$ then

12: $y \leftarrow y + 2s_y$

13: end if

14: if $t_{min} = t_\theta$ then

15: $\theta \leftarrow \theta + 2s_\theta$

16: end if

17: $t_x \leftarrow (x + s_x)/v_x - x_0/v_x$

18: $t_y \leftarrow (y + s_y)/v_y - y_0/v_y$

19: $t_\theta \leftarrow (\theta + s_\theta)/v_\theta - \theta_0/v_\theta$

20: $t_{prev} \leftarrow t_{min}$

21: $t_{min} \leftarrow \min(t_x, t_y, t_\theta)$

22: Check cell $(x, y, \theta)$ and weight by $t_{min} - t_{prev}$

23: end while

FIG. 7C

METHOD AND DEVICE FOR ESTABLISHING A TRAJECTORY FOR A VEHICLE

CROSS REFERENCE TO RELATED APPLICATION

This application claims priority under 35 U.S.C. §119 from German Patent Application No. 10 2014 205 170.3, filed Mar. 20, 2014, the entire disclosure of which is herein expressly incorporated by reference.

BACKGROUND AND SUMMARY OF THE INVENTION

The invention relates to a method and a device for establishing a trajectory for a vehicle.

There are various driver assistance systems, which assist the driver of a motor vehicle with a partly automated or completely automated control of the motor vehicle. Such driver assistance systems include lane-change assist systems, braking assist systems, emergency or pedestrian avoidance assist systems or driver assistance systems for a fully automatic control of a motor vehicle.

Here, monitoring trajectories for collisions is very complicated and requires significant computational power in the motor vehicle.

Therefore, there is a significant need for a method and a device for establishing a trajectory for a motor vehicle, which can be carried out efficiently such that these can be calculated in real time where possible.

The invention is therefore based on the object of developing a method and a device for establishing a trajectory for a vehicle, in which efficient monitoring of the trajectory for collisions is possible.

This and other objects are achieved according to the invention.

The method according to the invention for establishing a trajectory in a vehicle comprises the following steps:

a) registering coordinates of objects using a sensor, b) calculating an occupancy map or cost map on the basis of the registered coordinates, wherein the occupancy map or cost map is subdivided into cells and a cell value is assigned to each cell, which cell value describes the presence and/or the vicinity of an object, c) calculating a cost space, which comprises a plurality of layers, wherein each layer is subdivided into cells and a cost value is assigned to each cell, wherein the cost values in the respective layers are calculated in each case for a specific orientation of the vehicle on the basis of the cell values, and d) determining a trajectory that is as cost-effective as possible.

Using the method of the present invention, a cost space comprising a plurality of layers is calculated, wherein each layer is subdivided into cells and a cost value is assigned to each cell, wherein the cost values in the respective layers are calculated in each case for a specific orientation of the vehicle.

An occupancy map is subdivided into cells, wherein each cell represents a specific location. Binary cell values are assigned to the cells. The cell values specify whether an object is situated at the respective location or whether no object is present there.

A cost map is subdivided into cells, wherein each cell represents a specific location. Cost values are assigned to the cells.

A cost value specifies whether the location represented by the cell should be driven-on or avoided. A high cost value means that the location should be avoided. A low cost value means that the location can be driven-on or should be driven-on. The set of numbers for the cost values includes at least more than two numbers. Therefore, cost values are not binary values.

By way of example, cost values can be collision probabilities specifying the probability that a vehicle which drives over the location of the respective cell collides with an object. These collision probabilities specify the probability that an object is present, or not, at a specific location and can include any probability values between 0 and 1. This is particularly expedient if the measurement of the objects is afflicted by measurement uncertainties. The cost values can also contain further information. In particular, the collision costs contain information about the distance to the closest object.

An occupancy map merely specifies at which location an object is present or not present. Hence, such an occupancy map describes the location of the objects and therefore only contains information obtained when registering the coordinates of the objects. Such an occupancy map can be used as a cost map. Since the occupancy map describes the location of the objects using binary values, an occupancy map is not a cost map.

In principle, it is also possible to use an inverse cost system, in which a low cost value means that the location should be avoided and a high cost value means that the corresponding location can be driven-on or should be driven-on. In such an inverse cost system, a cost-effective trajectory is a trajectory with high costs. However, since cost systems generally evaluate high cost values as being negative, the following only considers examples in which a high cost value means that the location should be avoided and a low cost value means that the location can be driven-on or should be driven-on.

Motor vehicles and autonomously driving robots can be used as vehicles. Such robots can be domestic robots which are embodied, e.g., for cleaning floors or for mowing lawns, or else robots in manufacturing plants.

A cost space can be calculated very efficiently from a cost map which is divided into cells, wherein a cost value is assigned to each cell. In order to calculate the cost space, known, modified methods from image processing for expanding or dilating the cost map into the individual layers of the cost space can be used. Therefore, the cost space can be calculated quickly in real time.

The cost values in the cost space can be collision probabilities which can assume all values between 0 and 1 inclusive. The cost values of the cost space can also contain further information in addition to the collision probability or else can be linked to the collision probability. In particular, the collision costs contain information about the distance to the closest object. They can also contain information about the reliability of the coordinates of the objects registered by the sensor.

The method according to the invention preferably establishes a collision-free trajectory. If no collision-free trajectory should be present, a cost function establishes a trajectory that is as cost-effective as possible.

When calculating the occupancy map or the cost map, a distinction is preferably made between static and dynamic objects and the dynamic objects are eliminated or filtered out. By way of example, this is brought about by setting the probabilities for the presence of a dynamic object to zero.

Calculating a layer of a cost space on the basis of the cost map or the occupancy map is brought about, in particular, by virtue of the probabilities for the presence of an object in the occupancy map being expanded by a footprint of the vehicle. In particular, the expansion is performed by a dilation or a convolution.

Each footprint of the vehicle has an anchor or reference point, which, e.g., is the center-of-mass of the vehicle. A point which is arranged in the middle or centrally in the vehicle to the greatest possible extent is preferably selected as anchor. The cell of the layer of the cost space, which corresponds to the location of the cell of the occupancy map at which the anchor of the footprint is situated during expansion and which is referred to as an anchor cell below, is assigned either the sum of all probabilities contained in the cells of the cost map within the footprint or the maximum of all probabilities contained in the cells of the cost map within the footprint.

If a cost map is assumed during the calculation of a layer of a cost space, then the cost values of the cost map can be expanded by means of a binary footprint in order to obtain the cost values of the cost space. By contrast, if an occupancy map is used, then a footprint of the vehicle which, in addition to binary spatial information of the vehicle, also contains additional information, in particular distance information, should be used. By way of example, such a footprint can be a binary footprint which is surrounded by a cost neighborhood which has reducing costs with increasing distance from the center of the vehicle.

The expansion of the cost map to the cost space can be carried out by means of a convolution, wherein, for the purposes of calculating the convolution, the occupancy map and the footprint are preferably transformed into the frequency space. As a result of this, the convolution of each individual cell can be carried out using only a single multiplication.

Before expanding the cost map to the layers of the cost space, the objects are preferably surrounded by a cost neighborhood in each case, wherein the cells within the cost neighborhood in the cost map are assigned cost values which successively decrease to the outer edge of the cost neighborhood. This corresponds to a cost function with which a very small distance between an obstacle and the vehicle is occupied by high costs.

The expansion can be carried out by means of a convolution, wherein a predetermined number of cost values are discretized and an inverse imaging function (h(n)) is used to image the convolution results onto a cost dilation. As a result of this, a cost dilation is obtained by means of a convolution.

A footprint of the vehicle preferably has a rectangular or square embodiment. Identical symmetries of the footprint in a cost map are preferably only calculated once. In the case of a rectangular form, the number of calculations can thus be halved. In the case of a square form of the vehicle, the number of computation processes can be reduced to a quarter.

The dilation or the expansion of a two-dimensional footprint of the vehicle can be replaced by two dilations with in each case a one-dimensional footprint. This can significantly reduce computational complexity. The footprint is preferably aligned in the axial direction of the cost map. Here, in particular, use is made of the vHGW method.

The cost values of the individual cells, through which the trajectory extends, are preferably weighted by the length of the respective portion of the trajectory in the corresponding cell when determining a trajectory in the cost space. As a result of this, a correct overall value of the collision probability or of the costs is established with little computational complexity.

A device for establishing a trajectory for a vehicle comprises a sensor apparatus, a computer apparatus and an interface, wherein the computer apparatus has a computer program embodied to execute a method as mentioned above.

A trajectory with a risk of collision that is as low as possible can be provided at the interface. The interface can be coupled to a lane-change assist system, an automatic braking assist system, an emergency or pedestrian avoidance assist system or a completely autonomous driver assistance system.

The device can also be a component of a house or lawn robot, which automatically identifies obstacles and drives around them. Such a lawn robot, which may e.g. be embodied as a mowing robot, can also include a camera as a sensor apparatus, by means of which it identifies regions in which the grass has not yet been cut and assigns low costs to these regions such that the driving and mowing is preferably carried out in regions with uncut grass, wherein, preferably, the sensor apparatus additionally has a laser scanner for precisely detecting obstacles.

In principle, a sensor apparatus of these devices for vehicles and robots can be a laser scanner and/or a camera with the corresponding digital image evaluation apparatus and/or a radar.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 3A,B show the geometry or the footprint of a vehicle, which is superposed on a cost map;

FIGS. 4A-E schematically show a detected drive region, as is registered by the sensor apparatus, after a binary dilation, after a binary convolution, after a cost dilation and after a cost convolution;

FIGS. 5A-D schematically show a footprint of a vehicle, an object, an object with cost neighborhood and the layers in a cost space with and without a cost neighborhood, and also a continuous cost space;

FIGS. 7A-C schematically show the FAMOD method, vHGW 360 method and the determination of the trajectory.

DETAILED DESCRIPTION OF THE DRAWINGS

Figure 1:
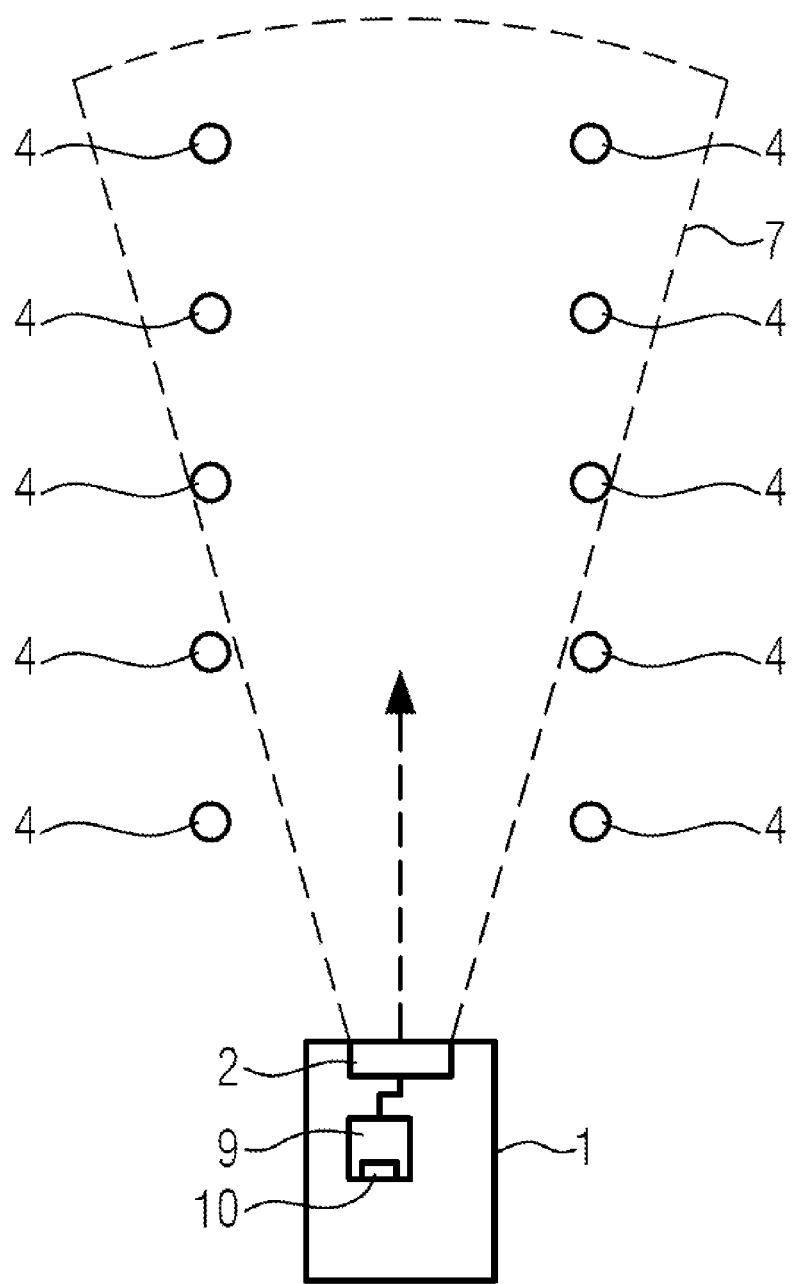
FIG. 1 schematically shows a vehicle with a sensor apparatus for detecting obstacles in a scanning region.

The method automatically establishes a trajectory which is as collision-free as possible for a vehicle, wherein the trajectory is made available to different driver assistance systems. By way of example, these driver assistance systems are an automatic braking assist system, a pedestrian avoidance assist system, an automatic lane-change system or even a highly automated driving system which independently drives the vehicle in most driving situations.

The vehicle 1 includes a sensor 2, which is arranged at the vehicle 1 in such a way that the field of view of the sensor is directed along the orientation 3 of the vehicle. The sensor 2 can include one or more sensors. By way of example, these sensors may be a laser scanner or radar. The surroundings of the vehicle can be registered with high accuracy using a laser scanner. Radar is less accurate but advantageous in that it also supplies information about the relative, radial speed of objects 4 in respect of the vehicle.

A two-dimensional occupancy map is generated on the basis of the registered coordinates of the objects. The occupancy map is subdivided into cells and each cell is assigned a binary value, i.e. the values 0 and 1, for the presence of an object.

The occupancy map is converted into a cost map, in which the values of the individual cells can assume more than two values. If the measurements are afflicted by measurement inaccuracies, the cells can then also be assigned an occupancy probability, which specifies how probable it is that an object is present in this cell. By way of example, in such an embodiment, the cells that are in the viewing shadows of the sensors and therefore cannot be registered are occupied with a probability of 0.5, meaning that it is equally probable that the cell is provided with an object or has no object.

The method preferably merely considers static objects, i.e. dynamic objects are eliminated. By way of example, dynamic objects can be identified on the basis of the relative velocity of the object with respect to the vehicle, wherein this negative relative velocity differs from the driving velocity of the vehicle by a predetermined threshold value. Dynamic objects can also be registered by time-offset scanning of the same location, wherein a dynamic object is distinguished by virtue of providing different cell values for the same location.

Therefore, the cost map is a two-dimensional data field in which, e.g., the occupancy probabilities for the occupancy by objects or obstacles are entered. Such a cost map includes a scanning region 7 arranged in front of the vehicle in the orientation of the vehicle, which scanning region 7 is registered by the sensor 2. This scanning region 7 extends over the range of the sensor and can have a length of e.g. 50 m to approximately 500 m. This scanning region 7 is embodied in a manner widening in approximately the shape of a circular segment, wherein the width of said region increases with increasing distance from the vehicle 1.

It is also possible to complement the cost map with further information which goes beyond the description of the objects at the locations represented by the respective cells. Thus, cells at which no objects are present can be provided with cost values that are related to the distance to the closest object. Thus, cost values can be assigned to the cells within a predetermined distance range around the respective objects.

Proceeding from such a cost map, a cost space (configuration space obstacles) is calculated. The cost space has a plurality of layers. Each layer is subdivided into cells. In each cell, a cost value is assigned for a vehicle with an object.

Methods for calculating collision spaces with binary cell values are known. However, these methods assume that the objects are representable as polygons in the occupancy maps. As a result of this, the calculation of collision values in the collision space can be simplified and such a calculation can be executed quickly. However, it was found that the objects in reality cannot always be represented correctly by a polygon. Therefore, a different path was followed in the present method.

The cost space has a plurality of layers. Each layer is subdivided into cells. Each cell is assigned a collision field for a vehicle with an object. When determining the cost values, the geometry of the vehicle is reduced to a point and the geometries of the objects are expanded accordingly.

Figure 2A:
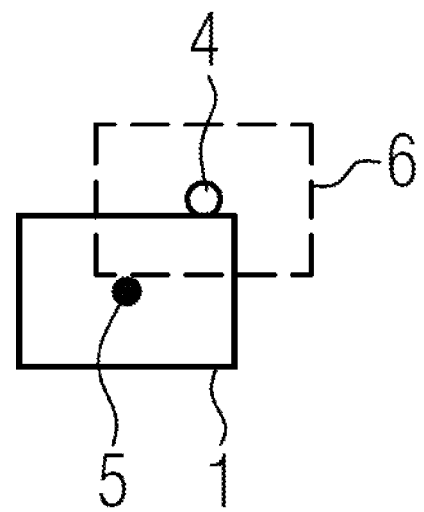
FIGS. 2A,B schematically show a punctiform obstacle and a vehicle with expanded regions in the cost space.
Figure 2B:
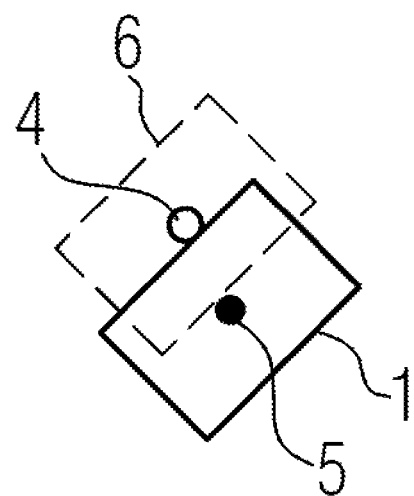

FIG. 2a shows a punctiform object 4 and a vehicle 1 with a rectangular cross section. A point of the vehicle 1 is selected as reference point 5 which, for example, is the center of mass of the vehicle. The reference point 5 can also be a different point of the vehicle. Preferably, a point which is arranged as centrally as possible in the vehicle is selected as the reference point. The object 4 is expanded in such a way that the expanded object 6 contacts the reference point 5 in a position of the vehicle in which, with the actual circumference thereof, it would contact the object 4. The size and the form of the expanded region 6 depend on the orientation 3 of the vehicle, as can be identified on the basis of FIG. 2b, in which the same vehicle is depicted with a different orientation 3 with respect to the object 4. The individual layers of the cost space therefore include cost values which correspond to the expanded regions 6, which are dependent on the orientation 3 of the respective vehicle 1. If the values are unambiguous, the cells in the cost space predominantly contain the values "1" and "0", wherein "1" corresponds to a collision and "0" corresponds to no collision. The pattern generated in these layers by the cells marked by "1" corresponds to the expanded regions 6 of the objects 4.

In other words, a two-dimensional body, which corresponds to the geometry of the vehicle, is inserted at each cell in which an object is situated. This two-dimensional body is also referred to as a footprint. The cells with objects are therefore expanded or dilated by the footprints aligned along the orientation of the vehicle. Such dilation processes are known from optical image processing. As explained in more detail below, such an expansion can also be carried out by means of a convolution.

The geometry of the vehicle can be designed in various ways. The geometry of the vehicle 1 is imaged on the cost map (FIG. 3a) and extends over a plurality of cells 11 of the cost map. In accordance with a first embodiment, the sum of all cost values contained in the cells 11 of the cost map can be assigned to this position of the vehicle (x, y, θ). If the cost values are probabilities for the presence of an object, use is then preferably made of an alternative embodiment in which the maximum of the cost values—instead of the sum—is assigned (FIG. 3b). If use is made of the sum, a normalization then has to be performed since the values emerging from the sum may be greater than 1. Moreover a region which is not clearly restricted locally but has a low probability of a collision may generate a high cost value when summing the probabilities, whereas a high probability for the presence of an object clearly restricted spatially to a single cell of the cost map may result in a smaller value. This is undesirable, and therefore the use of the maximum is preferred. By the expansion or dilation of the cost map with respectively different directions of the vehicle, the two-dimensional cost map is converted into three-dimensional cost space, wherein each layer of the cost space corresponds to a different vehicle direction of the vehicle.

Since the various layers of the cost space have the cost values for different orientations of the vehicle, the orientation is discretized. Preferably, the cost space is only generated for a certain angle range around the current orientation of the vehicle. Moreover, this angle range can depend on the current driving velocity of the vehicle since it is practically impossible at a high driving velocity, which e.g. is typical for a trip on a freeway, for the vehicle to change its orientation by e.g. more than 20° to 40° on the next 100 m of route in the case of an appropriate driving style. Thus, at high driving velocities, a significantly smaller cost space can be calculated than at low driving velocities, the latter e.g. extending about an angle of +/−20° to 45° about the current orientation of a vehicle. This enables quick provision of the cost space at high velocities. Discretization can be brought about with a uniform angle spacing of e.g. 0.1° to 1° between adjacent layers. However, the discretization can also be carried out with different angle spacings or resolutions wherein, in particular, a small angle spacing is used for the angles adjacent to the current orientation and a larger angle spacing is used in the case of larger directional differences from the current orientation. As a result of this, the data volume of the cost space can be kept small.

The cost values of the cost space can be collision probabilities. If the measurements of the coordinates of the objects using the sensor 2 are afflicted by error probabilities, then these can also be accounted for in the cost values. Locations not registered by the sensor 2 can be provided with a collision probability of 0.5. Such cost values for example specify the distance to the closest object or obstacle. These cost values are modified on the basis of the registered, by the above-described expansion or dilation, or calculated from the collision probability.

Then, a trajectory which is as collision-free as possible is determined using this cost space. The trajectory is composed of small sections, the length of which approximately corresponds to the center-to-center distance between adjacent cells in the cost space. The corresponding cost values for the individual trajectory sections can be read from the corresponding cell in the cost space on the basis of the location (x, y) and the alignment or orientation 3 of the vehicle (θ). No further calculations are required to this end. Therefore, the cost space merely constitutes a lookup table when establishing the trajectory.

A multiplicity of collision-free trajectories may emerge. This multiplicity of collision-free trajectories should be reduced to a single expedient trajectory where possible. To this end, an optimization according to trajectories that are as flat as possible can be performed, since a vehicle should be controlled as uniformly and straight-lined as possible.

If the cost values of the cost space are cost values specifying the distance to the closest object, the trajectory which has the lowest overall costs is established. As a result, the maximum distance from the object is maintained.

Preferably, lane markings which delimit a lane are registered as objects and accounted for such that the trajectory extends as centrally as possible in the lane. If this method is used for a lane-change assist system, the markings between two lanes, between which the change is to take place, are to be eliminated as objects. This is carried out by appropriate prescription by the lane-change assist system.

Such automatically generated trajectories can be used in a fully automatic driver assistance system, wherein the vehicle is controlled completely automatically if a completely collision-free trajectory is present. By contrast, if no collision-free trajectory is present, then, for example, the most cost-effective trajectory is selected and further additional functions are used for avoiding objects. By way of example, such an additional function can be transferring the control of the vehicle to the driver of the vehicle. However, it is also possible for the driving velocity to be reduced, as a result of which more time is available for registering the objects using the sensor and as a result of which there can be a correspondingly more precise registration of the objects. As a result of this, the cost map can be established with a higher resolution and accordingly a cost space can be established with a higher resolution. If a collision-free trajectory emerges in the cost space with a higher resolution, the vehicle can continue to be controlled automatically. By contrast, if no collision-free trajectory is present at the higher resolution either, then the control of the vehicle must be transferred to the driver or the vehicle must be stopped in front of the objects in good time.

The basic principles of the method for automatically establishing a trajectory that is collision-free as possible are set forth above. This method is predominantly provided for providing a collision-free trajectory for the section lying immediately in front of the vehicle in the driving direction of the vehicle, wherein static objects are accounted for, or, if no collision-free trajectory is possible, for identifying the corresponding objects.

Therefore, the cost space should be calculated in real time. Two exemplary embodiments, by which the cost space can be calculated in real time, are explained below.

A binary collision space $C_{obs}$ with merely "1" and "0" as collision values can be represented by the following equation:

$$C_{obs} = \bigcup_\theta B \oplus S_\theta, \qquad (1)$$

where θ denotes the angle of the orientation, B denotes the values of the occupancy map and $S_\theta$ denotes the footprint of the vehicle. The operation "⊕" is the Minkowski sum, which brings about a dilation of the values of the occupancy map set to "1" by the respective footprint.

The binary collision space $C_{obs}$ can equally be calculated by the following convolution:

$$(f_1 * f_2)(n) = \sum_{i \in D} f_1(i) f_2(n-i), \qquad (2)$$

where the functions $f_1$ and $f_2$ are convoluted with one another and the function $f_1$ represents the occupancy map B and the function $f_2$ represents the footprint S of the convolution (B*S). The convolution can easily be imaged on the above-explained dilation using the function h(n), such that the following applies:

$$B \oplus S = h(B * S), \text{ where} \qquad (3)$$

$$h(n) = \begin{cases} 0 & n = 0 \\ 1 & n > 0 \end{cases}. \qquad (4)$$

A great advantage of the convolution lies in the convolution theorem, according to which the convolution can be carried out by way of a single multiplication in the frequency space, as a result of which the calculation of the convolution is independent of the size and the form of the footprint S. Therefore, the functions representing the occupancy map B and the footprint S are preferably transformed into the frequency space by means of an appropriate transform, e.g. the FFT (Fast Fourier Transform). This allows a very quick calculation of the convolution with in each case a single multiplication per cell.

Instead of a binary collision space, it is also possible to calculate a grayscale cost space, which is referred to below as a continuous cost space. Here, a cost map M which has probabilities [0; 1] in each cell is assumed. When expanding the cost map to the individual layers of the cost space, the maximum value of the probabilities situated within the geometry of the footprint of the vehicle is used as cost value in the cost space, as explained above. The expansion to the continuous cost space $C_{costs}$ can therefore be represented by the following equation:

$$C_{costs} : \begin{cases} C \to R'_0 \\ q \mapsto (M \oplus S_q) \end{cases} \text{ and} \qquad (5)$$

$$M \oplus S_{\theta,n} = \max(M(n-x) + S_{\theta,n}(x) \mid x \in S_{\theta,n}), \qquad (6)$$

where M denotes the cost map, $S_{\theta,n}$ denotes the footprint of the vehicle and n denotes the cell position of the anchor point.

Since the footprint is a flat structure element as all the values thereof are "0", this equation can be simplified as follows:

$$M \oplus S_{\theta,n} = \max_{x \in S_{\theta,n}} M(n-x). \quad (7)$$

FIG. 4a depicts the measured values of a scanning region, wherein the black lines and the black point represent a detected object with a probability p(x)=1, the white region depicts a free space without an object (probability for an object p(x)=0) and the shaded region represents an unregistered region since it lies in the shadow of the objects, in which the probability of an object is p(x)=0.5. Moreover, there is an uncertain region (pentagon) with a probability of an object of p(x)=0.25.

FIG. 4b shows, for a single orientation 3, a binary dilation for a rectangular vehicle, in which merely the objects measured with the probability of "1" are expanded.

FIG. 4c shows the results of a binary convolution for the orientation 3 of the vehicle.

By contrast, a cost dilation in accordance with FIG. 4d and a cost convolution in accordance with FIG. 4e emerge if probabilities of objects that are less than 1 are also taken into account during the dilation or convolution. In the convolution in accordance with FIG. 4e, the sum of the individual values of the cost map was considered instead of the maximum. As a result, the small but clear object depicted as a point in FIG. 4a was converted into barely visible bright cost values, whereas the substantially larger pentagon, in which the individual cells have a small collision probability, is reproduced substantially more strongly. This clearly shows the disadvantage of using the sum instead of the maximum when expanding the cost map to the cost space.

When use is made of a continuous cost space, the objects 4 are preferably surrounded by a "cost neighborhood" 8, wherein, within the form of the object, the cost value is "1" and said value successively decreases from the edge of the form of the object to the edge of the neighborhood. As a result of this, a cost value not equal to "0" is generated once the vehicle is within a certain distance of the object.

FIG. 5b shows the expansion of the object 4 without the use of such a cost neighborhood 8 in accordance with the digital dilation for layers with an orientation of 0°, 60°, 120° and 180°. FIG. 5c shows the same layers, but with use of the cost neighborhood 8. FIG. 5d shows the continuous cost space of the object 4 from FIG. 5a using the cost neighborhood 8.

Below, a first exemplary embodiment for a grayscale or cost dilation is explained, which is referred to as FAMOD (Fast Approximate Grayscale Dilation for Arbitrary Footprints) below (FIG. 7a). The cost dilation is carried out by convolution. A morphological dilation belongs to the class of the nonlinear, image processing filters that cannot be represented by a pure convolution. This is not possible since the maximum operator is a nonlinear operator and therefore, as a matter of principle, cannot be represented by a sum. Therefore, the following path is proposed:

If k is taken to be the number of set cells (i.e. containing the value "1") of a binary occupancy map B within the footprint S, then the least and greatest possible value of the convolution in any occupancy map B with the footprint S is $$\max(B*S) = k$$

$$\max(B*S) = 0 \quad (8),$$

if the binary values are from B{0,1}. If a binary cell map $B^{\{u,v\}}$ with any two values u and v is considered, where u is less than v, then the following values emerge as maximum and minimum in this map:

$$\max(B^{\{u,v\}}*S) = kv$$

$$\min(B^{\{u,v\}}*S) = ku \quad (9).$$

This is used for deriving an image of the maximum cost value from the sum. If the cost map contains r different cost values $c_0, \ldots, c_{r-1}$, where $c_0 < \ldots < c_{r-1}$ and $\epsilon$ is a small positive number, then it is possible, by imaging the cost values with the inverse relationship $$g(c_0) = c_0$$

$$g(c_i) = kg(c_{i-1}) + \epsilon \quad (10)$$

and by inverse imaging the convolution result and by using $$h(n) = \begin{cases} c_0 & g(c_0) \leq n < g(c_1) \\ \vdots \\ c_{r-2} & g(c_{r-2}) \leq n < g(c_{r-1}) \\ c_{r-1} & n > g(c_{r-1}) \end{cases} \quad (11)$$

to obtain a cost dilation of any grayscale or continuous cost map M with a flat structure element or footprint S by convolution:

$$M \oplus S = h(g(M)*S) \quad (12).$$

The values of the imaging function g in accordance with equation 10 grow exponentially with the number of cost values r. Therefore, it is expedient to reduce the possible cost values. This can be brought about either by uniform quantization of the resolution or by an irregular assignment which takes further information into account. Here, what is also to be taken into account is that the primary interest in the case of a cost map lies in distinguishing between cells which are free from an obstacle or object with a high probability, cells which are occupied by an object with a high probability and cells in which no clear statement is possible. Therefore, three or four cost values in the cost map often suffice.

Such a method was implemented using an NVIDIA graphics card (NVIDIA GeForce GTX 660 Ti) and corresponding software tools, the NVIDIA CUDA [4.2]. Such graphic cards enable a parallel calculation of computationally intensive operations. The calculation of the convolution is highly parallelizable since it can be performed individually and independently for each cell, wherein the same computational operations are to be carried out for each cell. FIG. 7a sketches out the basic steps of the FAMOD method. Here, use is made of the library for the Fast Fourier Transform already available in CUDA. All functions are implemented as individual kernels and parallelized by way of the cells of the cost map. Equations 10 and 11 cannot be efficiently represented in CUDA since they require loops and conditions. Under the assumption that $c_0 = 0$ applies, the inverse relationship in accordance with equation 10 is representable by a generating function which is the following geometric sequence:

$$g(c_i) = kg(c_{i-1}) + \varepsilon = \quad (13)$$

$$= k^{i-1}\varepsilon + k^{i-2}\varepsilon + \ldots + k\varepsilon + \varepsilon =$$

$$= \varepsilon \sum_{j=0}^{i-1} k^j = \varepsilon \frac{1-k^i}{1-k}.$$

The result of the convolution n can be imaged without condition by solving for i, with $$i = \left\lfloor \log_k \left[ 1 - \frac{1-k}{\varepsilon} n \right] \right\rfloor \tag{14}$$

$$h(n) = c_i,$$

and replace equation 11.

Using this method, a cost space could be calculated within a few milliseconds from a cost map with 512×512 cells and a footprint with 25×25 cells. A computational time of 25 ms was required for calculating a cost space with 180 layers when a mask with 25×11 cells was used, which corresponds to a vehicle with dimensions of 5 m×2 m in the case of a cell resolution of 0.2 m. The required computational time is approximately proportional to the number of layers, and so the computational time can be reduced accordingly if the angle ranges are reduced or if the angle spacings are increased. Taking into account the symmetries, these 180 layers correspond to 360 layers for a rectangular vehicle or 720 layers for a quadratic vehicle.

Once the cost space has been generated, the trajectory can be determined very quickly therefrom.

This shows that a collision-free trajectory or objects can be determined in real time.

In a second exemplary embodiment, the van Herk/Gil-Werman method (vHGW), known from image processing, was used. By way of example, this method is known from M. van Herk, "A fast algorithm for local minimum and maximum filters on rectangular and octagonal kernels", *Pattern Recognition Letters*, volume 13, number 7, pages 517-521, July 1992 and J. Gil and W. Werman, "Computing 2-d min, median, and max filters", *IEEE Trans. Pattern Anal. Mach. Intell.*, volume 15, number 5, pages 504-507, May 1993. The implementation of the van Herk/Gil-Werman method on GPUs is described in the two publications L. Domanski, P Valloton and D. Wang, "Parallel van herk/gil-werman image morphology on GPUs using CUDA", NVIDIA GPU Computing Poster Showcase 2009, [online], retrievable: http://www.nvidia.com/content/GTC/posters/14_Domanski_Parallel_vanHerk.pdf and M. Thurley and V. Danell, "Fast morphological image processing open-source extensions for GPU processing with CUDA", *IEEE J. Sel. Topics Signal Process.*, volume 6, number 7, pages 849-855, November 2012. This known vHGW method is optimized for calculating the cost space by the modifications, explained in more detail below, and adapted for calculating the cost space.

Taking into account the symmetries of the rectangular form of the footprint S can be used in multiple ways for reducing the computational outlay. Firstly, the anchor of the footprint or the structure element should be provided in the center of the footprint. To this end, the footprint should be selected to have dimensions such that it has an odd number of cells in both the longitudinal direction and the transverse direction. As a result, the cell lying in the center in both the longitudinal direction and the transverse direction can form the anchor. A dilation of the footprint for a specific angle β corresponds to the dilation of the footprint which is rotated by the angle β+180°. As a result of this, the number of dilations to be calculated can be reduced to half. If the footprint is square, the number of dilations can be reduced to a quarter.

Furthermore, the associative law applies to the dilation, as a result of which the following applies to the footprint S and the cost map M:

$$S = S_1 \oplus S_2 \tag{15}$$

$$M \oplus S = (M \oplus S_1) \oplus S_2. \tag{16}$$

As a consequence, the dilation of a two-dimensional footprint can be reduced to two dilations with in each case a one-dimensional footprint, as a result of which the number of the calculations to be performed per cell is reduced from wh to w+h, wherein w and h are the width and the height of the footprint. If the rectangular footprint is not aligned in the direction of the axis of the cost map, errors can occur when the reduction to two one-dimensional footprints takes place since certain cells are not taken into account in the dilation in that case. Therefore, it is expedient to rotate the cost map M at the point of the structure element S in accordance with the following equation:

$$M \oplus R_\alpha(S) = R_\alpha(R_{-\alpha}(M) \oplus S) \tag{17},$$

where $R_\alpha$ means a rotation through the angle α.

In accordance with equation (17), each dilation requires two rotations of the cost map M as a matter of principle. However, the rectangular form of the structure element can once again be employed here in order to reduce the number of rotations as dilations through the angle α correspond to the dilations through the angle α+90°, wherein merely the width and the height are interchanged. Therefore, two dilations can be calculated with one pair of rotations.

The dilations with one-dimensional axis-aligned footprints or structure elements can be calculated very efficiently using the van Herk/Gil-Werman method. M. Van Droogenbroeck and M. J. Buckley. "Morphological erosions and openings: Fast algorithms based on anchors", *J. Math. Imaging Vis.*, volume 22, numbers 2-3, pages 121-142, May 2005 and D. Lemire, "Faster retrieval with a two-pass dynamic-time-warping lower bound", *Pattern Recognition*, volume 42, number 9, pages 2169-2180, September 2009 and P. Dokládal and E. Dokládalová, "Computationally efficient, one-pass algorithm for morphological filters", *J. Vis. Comun. Image Represent.*, Volume 22, number 5, pages 411-420, July 2011 have also disclosed other methods for carrying out a dilation with a one-dimensional footprint or structure element.

The vHGW method is used in the present exemplary embodiment. It is independent of the size of the footprint. It has been shown that it requires 3-4/b comparisons per cell, where b is the width of the footprint. It requires an odd number of cells per footprint. This is achieved by rastering the cost map into non-overlapping blocks with a dimension of w, for which the results are calculated independently of one another. For each block, a larger window with a dimension of 2w−1 is centered around the block in order to calculate two cumulative maximum fields L and R. The cell in the center of a specific block of a linearized cost map M is denoted by j, with the following applying:

$$L[i] = \max(L[i-1], M[j-1]) \text{ and}$$

$$R[i] = \max(R[i-1], M[i-1]) \text{ with}$$

$$L[0] = R[0] = M[j] \tag{18}.$$

If use is made of L and R, the following emerges as a result O:

$$O[k+i] = \max(L[w-i], R[i]) \tag{19},$$

where $$\forall i = 0 : w-1, \text{ as a result of which } k \text{ is a start index of the block.} \tag{20}$$

Using the above-described modifications, the vHGW method for dilating a one-dimensional footprint as per the publication by M. Thurley and V. Danell, "Fast morphological image processing open-source extensions for GPU processing with CUDA", *IEEE J. Sel. Topics Signal Process.*, volume 6, number 7, pages 849-855, November 2012, was implemented, wherein the whole method is shown in FIG. 7*b* for the purposes of calculating the continuous cost space $C_{costs}$. First, in the steps in lines 1-5, the cost map is put into the i-th rotation and the 1D dilation with the vehicle length (line 3) and the 1D dilation with the vehicle width (line 4) for the orientation rotated by 90 degrees are performed simultaneously. Subsequently, in the steps in lines 6-15, the partial result of the preceding calculation is rotated in such a way that the respective other 1D dilation (width or length) can be calculated (line 7+9 or 12). Subsequently, the ready calculated layer of the cost space is rotated in accordance with the respective orientation (line 10 or 13).

Collision spaces can also be calculated in real time by way of this method. The second exemplary embodiment is slightly slower than the first exemplary embodiment but can, in return, take any selection of cost values (e.g. also as floating-point number) into account.

Figure 6A:
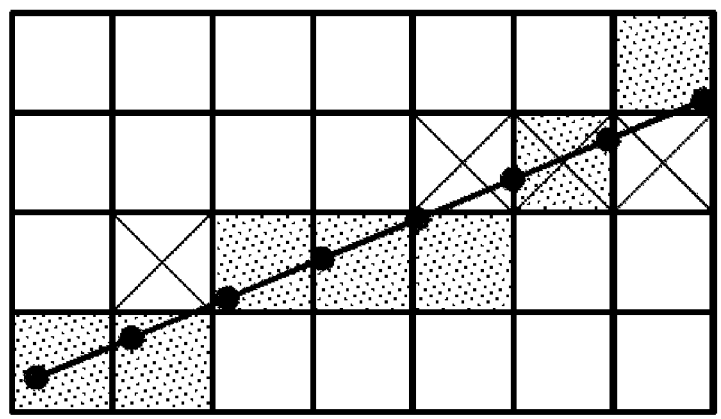
FIGS. 6A,B schematically show the scanning of the cost values in the cost space along a trajectory with regular distances and directed scanning.

Regardless as to whether the cost space was calculated in accordance with the first or the second exemplary embodiment, a trajectory that is as cost-effective as possible should be calculated. Here, it is desirable for the cost values of the individual cells, through which the trajectory leads, to be taken into account with as little outlay as possible. If the trajectory is scanned with the same spacing, the problem emerges in that cells which are only passed through over a short distance with an edge region may not be registered or in that the spacings of the scanning are so small that a plurality of cells are registered a number of times, as a result of which an unnecessary calculation load emerges. Such uniform scanning is shown in FIG. 6*a*, wherein the white cells provided with a cross are not registered and the cell with a cross shaded in gray is registered twice. As a result of this, incorrect cost values may emerge.

In the two-dimensional case, the problem of determining the cells through which the trajectory passes is related to the problem of rastering in the field of computer graphics. To this end, there are a number of solutions from computer graphics, such as from e.g. D. Hearn and M. P. Baker, *Computer graphics with OpenGL*, third edition, Pearson Education, 2004.

Figure 6B:
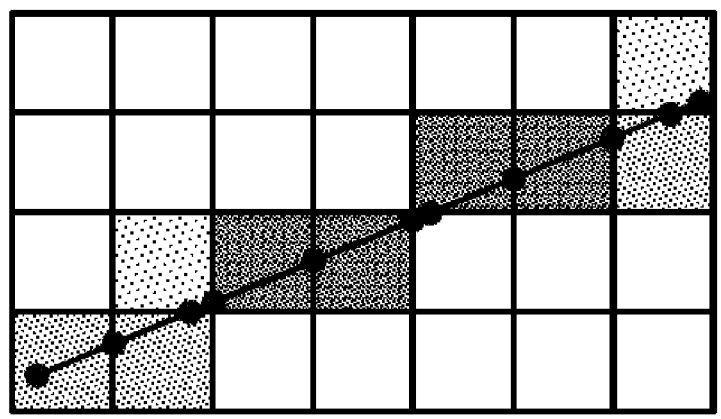

If these methods are to be applied to a vehicle geometry, it is necessary to extend these into higher dimensions. In order to solve the problem specified above, it is proposed initially to determine the intersections of the trajectory with the cell edges, as shown in FIG. 6*b*. This can be solved using a parametric equation of the straight line or trajectory $x(t)=p+tv$:

$$t_x(x) = \frac{1}{v_x}x - \frac{p_x}{v_x} \quad (21)$$

$$t_y(y) = \frac{1}{v_y}y - \frac{p_y}{v_y}$$

$$t_\theta(\theta) = \frac{1}{v_\theta}\theta - \frac{p_\theta}{v_\theta}.$$

Then, the cell intersections of the next cells are inserted for $(x, y, \theta)$ and the next cell to be checked in a three-dimensional configuration space is determined using min $(t_x, t_y, t_\theta)$ as this specifies the coordinates where the first intersection occurs. If there is an advance to the next cell and the test is repeated, all cells through which the trajectory passes are obtained, without taking certain cells into account a number of times.

The costs of the cells are extracted from the continuous cost space and calculated using the length of the path segment extending through the respective cell. This is elucidated in FIG. 6*b*. The whole method for calculating the overall costs of a trajectory is shown in FIG. 7*c*. A substantial part of the computational outlay lies in the conversion of angular coordinates into Euclidean coordinates. The weighting factor is $t_{min}-t_{prev}$. Using this method, the costs of a trajectory can be reliably calculated such that the trajectory with minimum costs can be determined. The trajectory with minimum overall costs is the trajectory which has the maximum distances from the objects.

The method for determining the overall costs of the trajectory can be used in conjunction with the exemplary embodiments for calculating a continuous cost space. In both cases it is possible to determine a trajectory with minimal costs in real time.

LIST OF REFERENCE SIGNS

1 Vehicle
2 Sensor
3 Orientation
4 Object
5 Anchor
6 Expanded region
7 Scanning region
8 Cost neighborhood
9 Computer apparatus
10 Interface
11 Cell The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for establishing a trajectory for a vehicle, comprising:
   a vehicle sensor configured to sense objects external to the vehicle;
   a vehicle computer, and
   an interface between the vehicle computer and at least one driver assistance system,
   wherein the computer has a stored computer program configured to:
      register coordinates of objects using object information received from the sensor;
      calculate an occupancy map or cost map on the basis of the registered coordinates, wherein the occupancy map or cost map is subdivided into cells and a cell value is assigned to each cell, which cell value describes a presence and/or a vicinity of an object;
      calculate a cost space, which comprises a plurality of layers, wherein each layer is subdivided into cells and a cost value is assigned to each cell, wherein the cost values in the respective layers are calculated in each case for a specific orientation of the vehicle on the basis of the cell values; and
      determine a trajectory for the vehicle that maximizes cost-effectiveness, and,
      provide to the interface the determined trajectory with the lowest possible risk of collision for forwarding to the at least one vehicle driver assistance system for execution.

2. A method for establishing a trajectory for a vehicle, the method comprising the acts of:
- registering coordinates of objects obtained using a vehicle sensor at a vehicle computer configured to determine the vehicle trajectory;
- calculating onboard the vehicle using the vehicle computer an occupancy map or cost map on the basis of the registered coordinates, wherein the occupancy map or cost map is subdivided into cells and a cell value is assigned to each cell, which cell value describes a presence and/or a vicinity of an object;
- calculating onboard the vehicle using the vehicle computer a cost space, which comprises a plurality of layers, wherein each layer is subdivided into cells and a cost value is assigned to each cell, wherein the cost values in the respective layers are calculated in each case for a specific orientation of the vehicle on the basis of the cell values;
- determining a trajectory for the vehicle that maximizes cost-effectiveness; and
- controlling the vehicle to move along the determined vehicle trajectory by forwarding the determined trajectory for execution by at least one vehicle driver assistance system.

3. The method according to claim 2, wherein the cost values in a collision space are represented by one or more of the following values, either individually or in combination:
- distance to the closest object,
- cost value expanded by a footprint of the vehicle in the cost map,
- reliability value of the coordinates of the object registered by the sensor, or
- collision probability, which is determined on the basis of the registered coordinates of the objects and empirical data or empirical relationships.

4. The method according to claim 2, wherein a distinction is made between static and dynamic objects when the cost map is calculated and dynamic objects are filtered out.

5. The method according to claim 2, wherein the cost values of the cells are designed by expansion using a footprint of the vehicle when calculating a layer of a cost space on the basis of the cost map, wherein the expansion is carried out by a dilation or by a convolution.

6. The method according to claim 3, wherein trajectories are monitored for possible collisions, and trajectories containing a collision are discarded.

7. The method according to claim 5, wherein each footprint of the vehicle has an anchor when expanding or dilating the cost map to the layers of the cost space, and
either the sum of all probabilities contained in the cells of the occupancy map within the footprint or the maximum of all cost values contained in the cells of the cost map within the footprint is assigned to the cell of the layer of the cost space which corresponds to the location of the cell of the cost map at which the anchor of the footprint is situated (referred to as anchor cell).

8. The method according to claim 5, wherein the cost map is expanded to the cost space by a convolution, wherein, for purposes of calculating the convolution, the occupancy map and the footprint are transformed into the frequency space.

9. The method according to claim 5, wherein prior to expanding the cost map to the layers of the cost space, the objects are surrounded by a cost neighborhood, wherein cost values successively decreasing to the outer edge of the cost neighborhood are assigned to cells within the cost neighborhood in the cost map.

10. The method according to claim 5, wherein the expansion is carried out by a convolution and the cost values are discretized into a predetermined number of cost values, wherein the number preferably lies in the range from 2 to 10, wherein an inverse imaging function ($h(n)$) is used to image the convolution results onto a cost dilation.

11. The method according to claim 5, wherein the cost values of the individual cells are weighted by the length of the portion extending from the trajectory through the respective cell when determining a trajectory in the cost space.

12. The method according to claim 6, wherein a distinction is made between static and dynamic objects when the cost map is calculated and dynamic objects are filtered out.

13. The method according to claim 7, wherein the cost map is expanded to the cost space by a convolution, wherein, for purposes of calculating the convolution, the occupancy map and the footprint are transformed into the frequency space.

14. The method according to claim 7, wherein the anchor cell of the footprint is arranged in the center of the footprint.

15. The method according to claim 12, wherein the cost values of the cells are designed by expansion using a footprint of the vehicle when calculating a layer of a cost space on the basis of the cost map, wherein the expansion is carried out by a dilation or by a convolution.

16. The method according to claim 13, wherein prior to expanding the cost map to the layers of the cost space, the objects are surrounded by a cost neighborhood, wherein cost values successively decreasing to the outer edge of the cost neighborhood are assigned to cells within the cost neighborhood in the cost map.

17. The method according to claim 14, wherein the footprint of the vehicle is rectangular and identical symmetries of the footprint of an occupancy map are only calculated once.

18. The method according to claim 16, wherein the expansion is carried out by a convolution and the cost values are discretized into a predetermined number of cost values, wherein the number preferably lies in the range from 2 to 10, wherein an inverse imaging function ($h(n)$) is used to image the convolution results onto a cost dilation.

19. The method according to claim 17, wherein the dilation or the expansion of a two-dimensional footprint of the vehicle is replaced by two dilations with, in each case, a one-dimensional footprint, wherein use is made of the vHGW method.

20. The method according to claim 18, wherein the dilation or the expansion of a two-dimensional footprint of the vehicle is replaced by two dilations with, in each case, a one-dimensional footprint, wherein use is made of the vHGW method.

* * * * *